United States Patent [19]
Rhodes et al.

[11] Patent Number: 5,668,234
[45] Date of Patent: Sep. 16, 1997

[54] REACTION INJECTION MOLDING (RIM) OF METHYL (METH)ACRYLATE AND RELATED MONOMERS USING GROUP-4 CATALYSTS

[76] Inventors: Larry Funderburk Rhodes, 3036 Vincent Rd., Silver Lake, Ohio 44224; Brian Leslie Goodall, 3959 Clover Hill Rd., Akron, Ohio 44333; Scott Collins, Apt. 9, 586 Victoria St., Kitchener, Ontario, Canada, N2M 3B1

[21] Appl. No.: 304,720

[22] Filed: Sep. 12, 1994

[51] Int. Cl.$^6$ .......................... C08F 20/14; C08F 4/643; C08G 63/08
[52] U.S. Cl. .................. 526/329.7; 526/134; 526/303.1; 526/341; 526/279; 526/309; 526/943; 528/319; 528/323; 528/326; 528/357; 528/359
[58] Field of Search ................... 526/329.7, 134, 526/279, 303.1, 341; 528/319, 323, 326, 357, 359

[56] References Cited

U.S. PATENT DOCUMENTS

| | | | |
|---|---|---|---|
| 4,728,706 | 3/1988 | Farnham et al. | 526/172 |
| 5,198,401 | 3/1993 | Turner et al. | 502/155 |
| 5,241,025 | 8/1993 | Hlatky et al. | 526/129 |
| 5,276,119 | 1/1994 | Kelsey | 526/170 |
| 5,312,881 | 5/1994 | Marks et al. | 526/126 |

OTHER PUBLICATIONS

An article entitled "Group–Transfer Polymerization Using Cationic Zirconocene Compounds" by Scott Collins and David G. Ward, *Journal of American Chemical Soc.*, vol. 114, No. 13, 1992.

NASA Technical Translation TT–21548 of Japanese Patent 2–258808, "Methods of Producing Vinyl–Type Polymers," Akira Nakamura, Hajime Yasuda, Oct. 19, 1990.

An article entitled "Coordination Polymerization Using Ziegler–Natta–Type Regents," Davis, Haddleton, and Richards, *J.M.S.–Rev. Macromol. Chem. Phys.* 1994, C34(1) 243–324. 294–7.

An article entitled "Free–Radically Initiated Polymerisations for Reaction Injection Mouldin (RIM): Some Observations On Polymer Blends Involving Poly(Methyl Methacrylate) As One Of The Components," P. D., Armitage, P. D. Coates, A. F. Johnson, S. Hill, J. Hydns, J. Leadbitter, and J. Myktiuk–*Makromol. Chem. Macromol, Symp.* 10/11, 593–615 (1987).

*Primary Examiner*—Mark Nagumo
*Attorney, Agent, or Firm*—Daniel J. Hudak; Nestor W. Shust; Thoburn T. Dunlap

[57] ABSTRACT

Acrylate monomers such as methyl methacrylate, or other suitable monomers such as lactams, lactones, or acrylamides, are polymerized by reaction injection molding (RIM) utilizing a combination of organo group-4 catalysts, e.g., a neutral organo catalyst and a cationic organo catalyst. Preferably a Lewis acid is utilized which reacts with the neutral organo catalyst and forms in situ the cationic organo catalyst. Significant exotherms are rapidly generated and result in short cure times and typically in high conversions of at least 95 percent by weight of the monomer. The catalysts of the present invention give good control of tacticity and thus high Tg polymers such as syndiotactic methyl methacrylate can be produced. The use of the combination organo group-4 catalysts are well suited for reaction injection molding of finished articles wherein the neutral catalyst is fed to a mixing device in at least one stream and the cationic organo catalysts or the Lewis acid is fed in at least one or more different streams.

16 Claims, No Drawings

REACTION INJECTION MOLDING (RIM) OF METHYL (METH)ACRYLATE AND RELATED MONOMERS USING GROUP-4 CATALYSTS

FIELD OF INVENTION

The present invention relates to a reaction injection molding (RIM) process for polymerizing acrylate or other suitable monomers such as acrylamides, lactones and lactams utilizing a catalyst system containing a neutral organo titanium, zirconium, or hafnium catalyst in combination with an activating cationic organo titanium, zirconium or hafnium catalyst. More preferably the invention relates to the use of an organic Lewis acid which reacts with the neutral organo titanium, zirconium, or hafnium catalyst to form the cationic titanium, zirconium, or hafnium organo catalyst in situ.

BACKGROUND

Heretofore, only a limited number of monomers have been polymerized utilizing RIM polymerization techniques inasmuch as suitable catalysts for generating high exothermic reactions and rapid cure rates as well as being able to withstand temperatures above the Tg of the formed polymer have not been available or known. While bulk polymerization of acrylates exist, typically the reaction takes hours to achieve good conversions of monomer to polymer. Solution polymerization of acrylates is unsuitable for direct end product preparation via a RIM process.

SUMMARY OF THE INVENTION

Molded end products are obtained in relatively short periods of time by RIM or RRIM (Reinforced Reaction Injection Molding) or RTM (Resin Transfer Molding) of at least one stream of one or more acrylate or other suitable monomers containing a neutral organo group-4 catalyst with at least another stream of the same and/or different one or more acrylate or other suitable monomers containing an activating cationic organo group-4 catalyst or preferably an organo Lewis acid. Zirconium catalysts are particularly preferred. Upon mixing of the two streams at ambient temperature, a polymerization reaction commences with the mixed streams being immediately transferred to a mold wherein a high exothermic reaction rapidly occurs. Although optional, crosslinking agents are preferred and when used form a thermoset. Monomer to polymer conversion in excess of 90 or 95 percent is obtained along with controlled tacticity, controlled reaction time, and when acrylate monomers are used a clear, i.e, transparent or translucent polymer is produced.

DETAILED DESCRIPTION OF THE INVENTION

The present invention generally relates to a combination that is a multi-component catalyst system such as one or more neutral organo group-4 catalysts and one or more Lewis acids or cationic organo group-4 catalysts with each component generally being separately added with one or more monomers in separate streams and mixed whereupon a polymerization reaction occurs. Although a plurality of feed streams can be utilized, desirably only two streams are utilized along with a two component catalyst system. The mixed streams are immediately transferred to a mold whereupon the reaction continues under high exotherms and forms an end product or article containing polymerized polymers therein. If crosslinking agents are added to either stream, a thermoset polymer is produced.

The (meth)acrylate monomers which can be utilized in the RIM process of the present invention are generally represented by the formula:

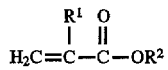

Formula I where $R^1$ is preferably hydrogen or an alkyl having from 1 to 4 carbon atoms with methyl being preferred. $R^2$ in the case of an acrylate monomer is an alkyl or cycloalkyl having from 1 to 10 carbon atoms with methyl, butyl, or 2-ethyl hexyl, or combinations thereof being preferred. $R^2$ can also be $R^5$-silyl-$R^6$ or $R^5$-siloxane-$R^7$, where $R^5$ is non-existent, an alkylene having from 1 to 10 carbon atoms and where $R^6$ or $R^7$ is non-existent, hydrogen, or an alkyl having from 1 to about 10 carbon atoms and wherein the siloxane group naturally can have alkyl substituents of from 1 to about 4 carbon atoms thereon. The number of silicon repeat groups within the silyl or siloxane group can be from about 1 to about 1,000 and preferably 1 to 100. Examples of such silicon containing monomers include 3-methacryloxpropyltrichlorosilane, 3-methacryloxypropyltrimethoxysilane, 3-methacryloxypropyltris(methoxyethoxy) silane, 3-methacryloxypropyltris(trimethylsiloxy)silane. Polymeric macronomomers include monomethylacryloxypropyl-terminated polydimethysiloxane. Polymeric crosslinkers include dimethylacryloxypropyl-terminated polydimethylsiloxane.

When the monomer is an acrylamide or methacrylamide, the formula is

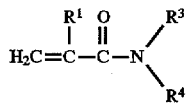

wherein $R^3$ and $R^4$ independently is hydrogen or a hydrocarbyl such as an alkyl or aryl having from 1 to 8 carbon atoms. Specific examples of acrylamide include dimethylacrylamide, diethylacrylamide, and the like.

Other monomers which can be utilized in the present invention include lactams and lactones which contain a total of from 3 to 8 or 9 carbon atoms in the ring as well as optionally one or more alkyl substituents having from 1 to 5 carbon atoms. Examples of such specific monomers include β-propiolactone, β-methylpropiolactone, δ-valerolactone, ε-caprolactone, caprolactam, and the like. Another class of monomers include acrylonitrile and the alkyl derivatives thereof containing from 1 to 4 carbon atoms such as methacrylonitrile.

When a crosslinked end product or article is desired, crosslinking agents are utilized such as alkylene polyol di and tri(meth)acrylates, including polymeric di and tri (meth) acrylates having a total of from about 6 to about 1,000 and preferably from about 6 to about 500 carbon atoms. Specific examples include trimethlolpropane tri(meth)acrylate, diethyleneglycol di(meth) acrylate, ethylene glycol di(meth) acrylate, 1,3 or 1,4-butyleneglycol diacrylate, 1,6-hexmethyleneglycol di(meth)acrylate, pentaerythritol tetra (meth)acrylate, dimethylene or triethylene glycol di(meth) acrylate, and the like. Preferred crosslinking agents include ethyleneglycol di(meth)acrylate and diethyleneglycol di(meth)acrylate, polyethyleneoxide dimethacrylate or diacrylate, poly-1,4-butyleneoxide dimethacrylate or diacrylate, and the like.

The first or neutral catalyst component of the catalyst system utilized in the present invention is a bis(cyclopentadienyl) derivative of a metal of group-4 of the Periodic Table of The Elements containing at least one ligand which will react with a Lewis acid, e.g., a proton, a triphenyl carbenium cation, a trialkylborane, a triarylborane, a trialkylaluminum, a triarylaluminum, and the like. The second component of the catalyst systems comprises a cationic bis(cyclopentadienyl) derivative of a metal of group-4 of the Periodic Table of The Elements. The anion of said cation is either a single coordination complex comprising a plurality of lipophilic radicals covalently coordinated to and shielding a central formally charge-bearing metal or metalloid atom or an anion comprising a plurality of boron atoms such as polyhedral boranes, carboranes and metallocarboranes, which anion is both bulky and labile, compatible with and non-coordinating toward the group-4 metal cation formed from the first component, and capable of stabilizing the group-4 metal cation without interfering with said group-4 metal cation's ability to polymerize the above noted monomers.

The one or more second components can be added preformed to the first or neutral component or they can be formed in situ upon mixing of the two or more streams.

A more detailed and specific description of the various group-4 neutral organo catalysts is forth in U.S. Pat. Nos. 5,198,401 and 5,241,025, which are hereby fully incorporated by reference.

A preferred neutral catalyst of the present invention is represented by the formula:

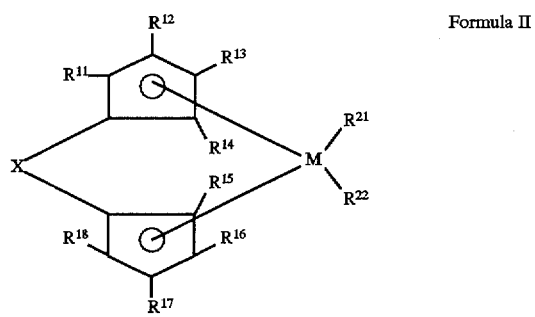

Formula II wherein X is a bridging linkage such as $CH_2$, $CMe_2$, $SiMe_2$, $CPh_2$, $SiPh_2$, $CH_2CH_2$, $CR^{31}R^{32}CR^{33}R^{34}$, and the like, wherein each $R^{31}$ $R^{32}$, $R^{33}$, and $R^{34}$, independently, is hydrogen, an alkyl or cycloalkyl having from 1 to 10 carbon atoms, or an aryl or an alkyl substituted aryl having a total of from 6 to 15 carbon atoms. $R^{11}$ through $R^{18}$, independently, is hydrogen, an alkyl having from 1 to 10 carbon atoms with methyl being preferred, a cycloalkyl having a total of from 4 to 9 carbon atoms, an aryl or an alkyl substituted aryl having a total of from 6 to 15 carbon atoms, or wherein two adjacent hydrocarbon groups, e.g., $R^{11}$ and $R^{12}$, etc., are connected to one another to form a hydrocarbon bridge between the two adjacent carbon atoms on the five-membered ring structure with the bridging carbon atoms being an alkylene having a total of from 2 to 8 carbon atoms. The substituents $R^{21}$ and $R^{22}$, bonded to the metal atom, each independently, is hydrogen, an alkyl or cycloalkyl having from 1 to 10 carbon atoms, an aryl or an alkyl substituted aryl having from 6 to 15 carbon atoms, or a hydrocarbyloxy, a hydrocarbylsulfide, or a dihydrocarbylamido wherein the hydrocarbyl group is an alkyl or cycloalkyl group having from 1 to 10 carbon atoms, an aromatic or an alkyl substituted aromatic or an aromatic substituted alkyl group having from 6 to 15 carbon atoms, or where $R^{21}$ and $R^{22}$ are joined to form a ring having from 3 to 8 carbon atoms and optionally contain a metal therein such as Si or Ge with the ring optionally containing hydrocarbyl substituents such as alkyl substituents having from 1 to 8 carbon atoms, or an enolate of the formula

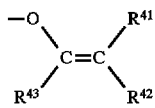

wherein $R^{41}$ and $R^{42}$, independently, are an alkyl having from 1 to 10 carbon atoms, a cycloalkyl having from 4 to 8 carbon atoms, or an aryl or an alkyl substituted aryl having a total of from 6 to 15 carbon atoms, and wherein $R^{43}$, independently, is the same as $R^{41}$, or is $Si(R^{44})_3$ where $R^{44}$, independently, is the same as $R^{41}$, and optionally where $R^{41}$ and $R^{42}$, or $R^{42}$ and $R^{43}$ are joined to form a ring, and optionally where $R^{43}$ of each enolate can be joined together. The metal, naturally, is a group-4 metal such as titanium, zirconium, or hafnium. Examples of suitable neutral catalysts include dimethyl ethylenebis($\eta^5$-tetrahydroindenyl) zirconium, dimethyl bis($\eta^5$-cyclopentadienyl)zirconium ($Cp_2ZrMe_2$), and bis ($\eta^5$-cyclopentadienyl)zirconium bis (dimethylmethoxy)enolate ($Cp_2Zr(OC(OMe)=CMe_2)_2$, dimethyl ethylene-bridged bis($\eta^5$-indenyl)zirconium ($C_2H_4$ ($\eta^5$-Indenyl)$_2$-$ZrMe_2$), dimethyl bis($\eta^5$-pentamethylcyclopentadienyl)zirconium, and the like.

Alternatively, the neutral catalysts need not contain a bridging group and thus has the formula

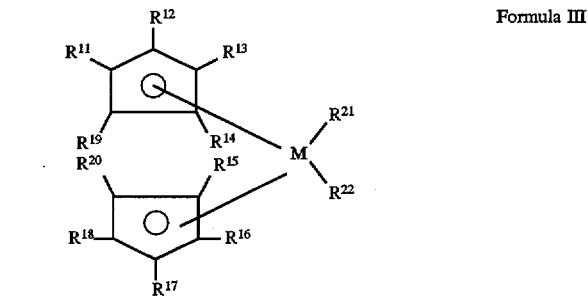

Formula III wherein $R^{19}$ and $R^{20}$, independently, is the same as $R^{11}$ through $R^{18}$, and wherein all the other groups are the same as set forth hereinabove.

The second component of the multi-component catalyst system can be a preformed cationic catalyst of the formula

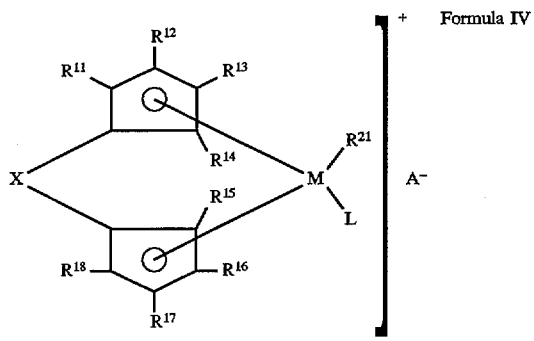

Formula IV or of the formula

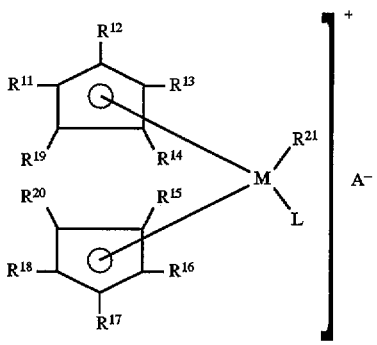

Formula V wherein M, $R^{11}$ through $R^{20}$, X, and the like are as set forth above, wherein L is a neutral Lewis base such as an ether (e.g., THF), sulfide, or a nitrile and the like.

In the absence of a suitable ligand donor L, the cationic metal center can exist as a Zwitterionic complex wherein the $A^-$ anion has the capability of stabilizing the group-4 cation by weak coordination to the group-4 metal center, but this anion can be easily displaced by a neutral Lewis base such as various above noted monomers, e.g., acrylates, methacrylates, acrylamides, lactones, etc., or other Lewis bases such as ethers, nitriles, and the like; or $A^-$ can also be $$B[Ar^1Ar^2Ar^3R^{50}]$$ Formula VI where $Ar^1$, $Ar^2$, $Ar^3$ can, independently, can be hydrocarbyl or halocarbyl substituted aryl groups and $R^{50}$ can also be hydrocarbyl or halocarbyl substituted aryl groups or $R^{50}$ can be the labile ligand from the organo group-4 catalyst; or $A^-$ can be polyhedral boranes, carboranes, or metallacarboranes.

Alternatively, the second component of the multi-component catalyst system can be produced in situ by reaction of the above-noted organo Lewis acids with the first catalyst system component in a deficient stoichiometric amount sufficient to produce a cationic group-4 catalyst in an amount which is less than the originally present first catalyst.

Organo Lewis acids generally include ammonium salts of a weakly or non-coordinating anion, or hydrocarbyl or halocarbyl (e.g., alkyl $C_1$–$C_{10}$) substituted aryls, triphenyl carbenium salts of a weakly or non-coordinating anion, or neutral substituted hydrocarbyl or halocarbyl (e.g., alkyl $C_1$–$C_{10}$)triphenyl group-13 Lewis acid which can contain boron, aluminum, gallium, etc. Examples of the ammonium salt Lewis acids include N,N-dimethylanilinium tetrakis (perfluorophenyl)borate, tripentylammonium tetrakis (3,5-bis(trifluoromethyl) phenyl borate, tributylammonium tetraphenylborate, triethylammonium tetraphenylborate and the like. N,N-dimethylanilinium tetrakis(perfluorophenyl) borate is preferred. Examples of various triphenyl carbenium salts include triphenyl carbenium tetra (perfluorophenyl) borate, and the like. Examples of neutral group-13 Lewis acids include tris(perfluorophenyl)boron.

The bulk RIM polymerization can be conducted in the presence of a Ziegler cocatalyst such as various homoleptic alkyls of group 12 and 13 metals of The Periodic Table of Elements so that the same can react with impurities in the reaction medium which may inhibit polymerization initiation. Examples of specific compounds include trimethyl aluminum, triethyl aluminum, triethyl gallium, and the like.

The one or more streams containing one or more monomers and the one or more different types of the neutral organo group-4 catalysts on one hand, and the one or more streams containing the one or more cationic organo group-4 catalysts or the one or more Lewis acid and the one or more monomers on the other hand, are brought together in a conventional mixing device (commonly referred to as a mixing head) with the same being well known to the art. The amount of the monomers in the one or more streams containing the neutral organo group-4 catalysts to the amount of monomers in the one or more streams containing the Lewis acid catalyst or the cationic organo catalyst is generally a volume ratio of from about 3 to about 1, desirably from about 2 to about 1, and preferably from about 1 to about 1.

The mole ratio of the monomers to the neutral organo group-4 catalyst, is generally from about 100 to about 3,000, and desirably from about 300 to about 1,000, whereas the mole ratio of the monomers to the Lewis acid or cationic organo group-4 catalyst is generally from about 100 to about 5,000, and desirably from about 500 to about 2,000.

Mixing of the two streams results in an exothermic reaction. When a cationic catalyst is utilized, it reacts with the monomer to activate the same to polymerization initiation by the neutral group-4 catalyst. However, in the preferred embodiment of the invention, the utilized one or more Lewis acids react with the neutral cocatalyst to in situ form a cationic catalyst which then reacts with the monomers in association with the neutral co-catalyst stream to polymerize such monomers. In either event, the temperature of the feed streams are desirably ambient, that is from about 15° C. to about 35° C., although higher or lower temperatures can be utilized. The reaction temperature is kept below the degradation temperature of the polymer being formed as by cooling. Hence the polymerization exotherm temperature of (methyl methacrylate) is generally below 200° C., desirably between about 80° to about 200° C., and preferably between about 100° C. to about 180° C. Inasmuch as the catalyst systems of the present invention are stable and active at temperatures above the Tg of the formed polymer, high exotherms can readily be utilized.

Typically, within a short period of time and preferably immediately upon mixing, the reaction mixture is transferred to a mold in the shape of a desired end product or article with the exotherm and polymerizing substantially occurring therein and forming the molded end product or article. Reaction times will vary depending upon the specific two-component catalyst system and particular monomers, but generally is from about 1 to about 30, desirably from about 1 to about 15, and desirably from about 1 to about 10, 7, or 5 minutes.

The two-component catalyst system of the present invention achieves high monomer to polymer conversion of at least about 90 percent by weight, desirably at least about 93 percent and, and preferably at least 95 or 98 percent by weight.

In addition to high monomer conversion, the generation of a high exotherm and rapid reaction of the monomers to form a RIM end product or article, the present invention has good tacticity control due to utilization of the above-noted multi-component catalyst system. Control of tacticity is important inasmuch as tacticity determines the Tg of the final product and allows control of the production of various configurations such as syndiotactic, isotactic or atactic. Thus, a poly(methyl methacrylate) can be produced having up to 85 percent or 90 percent of a syndiotactic configuration or up to 85 percent or 90 percent of an isotactic configuration as measured by $^1$H NMR at the triad level.

The two or more feed streams of the present invention can be modified by or blended with conventional amounts of typical or conventional ingredients or additives which are neutral, i.e., don't react or interfere with the polymerization reaction. Such fillers include impact modifiers, flame retardants, antioxidants, fillers including polymeric fillers, pigments, coloring agents, lubricants, viscosity modifiers, and the like. Examples of suitable fillers include compounds which are nonreactive with the monomer or catalyst such as small-size glass fibers, talc, silica, alumina, clay, and the like. To increase the viscosity any of the monomer streams, a viscosity modifier can be utilized such as poly(methyl methacrylate), generally in an amount less than 50 parts by weight and preferably less than 30 parts by weight per 100 parts by weight of monomer.

Inasmuch as an end product is directly formed by the present invention, it is an important aspect of the present invention that very low or nil amounts (substantially free) of solvents or diluents are tolerated within any of the feed streams. Thus, the amount of any diluent or solvent is generally less than 8 percent by weight, desirably less than 5 percent, more desirably less than 3 or 2 percent by weight based upon the total weight of all monomers, and preferably less than 1%, or 0.5%, or even less than 0.2%, and more preferably nil or non-existent. That is, all of the feed streams are generally free of any solvent or diluent.

Although it is highly preferred that the RIM polymers of the present invention are crosslinked, when not crosslinked, the weight average molecular weight is generally from about 100,000 to about 1,000,000 and desirably from about 100,000 to about 500,000 with the polydispersity, i.e., $\overline{Mn}/\overline{Mw}$ being from about 1.3 about 3.0 and desirably from about 1.5 to about 2.5.

The molds into which the mixed reactive components are injected are naturally in the shape of the desired end product which can be sanitary or bathroom items such as sinks, bathtubs, shower stalls, tabletops, and the like. The mold can also contain fibers such as glass, carbon, Kevlar™, and the like in the form of woven or nonwoven, with a fiber-reinforced molded product thus being formed via a RRIM process.

The following examples serve to better illustrate but not limit the present invention but does not limit the present invention.

The $^1$H NMR spectra were recorded on a Bruker AMX-500 NMR spectrometer operating at 500.14 MHz. All samples were dissolved in deuterated chloroform. Tacticities were determined by integration of the backbone pendant methyl peak at the triad level. Conversions were determined by integration of residual monomer versus polymer using the methyl ester protons.

Molecular weight measurements were made by GPC using samples (0.5 g) dissolved in 10 mL of THF (stabilized with 250 ppm BHT) and filtered through a 0.45 μm PTFE disc filter. The column set was Phenogel (guard+3×linear) +PLgel, 100 Å columns, all 5μ, in series. The detector was a Waters 410 RI detector, 1024×1. The molecular weight calibration curve was established with a set of PMMA standards from Polymer Laboratories, which covers molecular weight range from 1,210 to 53,000. The calibration curve was extended using the universal calibration method with a set of polystyrene standards from Polymer Laboratories, which covers molecular weight ranging from 162 to 8,500,000.

Tg measurements were recorded as second scans at a heating rate of 20° C./min in an aluminum DSC pan on a Mettler DSC30 instrument.

EXAMPLES

Example 1

Dimethyl bis(cyclopentadienyl)zirconium (Cp$_2$ZrMe$_2$, 0.24 mmol) and tri(perfluorophenyl)borane (B(C$_6$F$_5$)$_3$, 0.019 mmol) were dissolved separately in 2.5 mL of methylmethacrylate (distilled from triethylaluminum) each. The two solutions were mixed together. Within approximately 13 min., a maximum temperature of approximately 160° C. was reached and a solid polymer puck resulted.

Example 2

Dimethyl bis(cyclopentadienyl)zirconium (Cp$_2$ZrMe$_2$, 0.32 mmol) tri(perfluorophenyl)borane (B(C$_6$F$_5$)$_3$, 0.074 mmol) were dissolved separately in 2.5 mL of methylmethacrylate (distilled from triethylaluminum) each. The two solutions were mixed together. Within approximately 1.5 min., a maximum temperature of approximately 175° C. was reached and a solid polymer puck resulted.

Example 3

Dimethyl bis(cyclopentadienyl)zirconium (Cp$_2$ZrMe$_2$, 0.16 mmol) and tri(perfluorophenyl)borane (B(C$_6$F$_5$)$_3$, 0.037 mmol) were dissolved separately in 2.5 mL of methylmethacrylate (distilled from triethylaluminum) each. The two solutions were mixed together. Within approximately 3.5 min., a maximum temperature of approximately 172° C. was reached and a solid polymer puck resulted.

Example 4

Dimethyl bis(cyclopentadienyl)zirconium (Cp$_2$ZrMe$_2$, 0.32 mmol) N,N-dimethylanilinium tetrakis (perfluorophenyl)borate [HNMe$_2$Ph] [B(C$_6$F$_5$)$_4$], 0.075 mmol) were dissolved separately in 5 mL of methylmethacrylate (distilled from triethylaluminum) each. The two solutions were mixed together. Within approximately 4.5 min., a maximum temperature of approximately 190° C. was reached and a solid polymer puck resulted.

Example 5

Dimethyl bis(cyclopentadienyl)zirconium (Cp$_2$ZrMe$_2$, 0.32 mmol) N,N-dimethylanilinium tetrakis (perfluorophenyl)borate [HNMe$_2$Ph] [B(C$_6$F$_5$)$_4$], 0.075 mmol) were dissolved separately in 5 mL of methylmethacrylate (distilled from triethylaluminum) each. Approximately 1 wt percent (based on the monomer) of ethyleneglycol dimethacrylate was added to the solutions. The two solutions were mixed together. Within approximately 4.5 min., a maximum temperature of approximately 190° C. was reached and a solid polymer puck resulted.

Example 6

Dimethyl bis(cyclopentadienyl)zirconium (Cp$_2$ZrMe$_2$, 0.32 mmol) N,N-dimethylanilinium tetrakis (perfluorophenyl)borate [HNMe$_2$Ph] [B(C$_6$F$_5$)$_4$], 0.075 mmol) were dissolved separately in 5 mL of methylmethacrylate (distilled from triethylaluminum) each. Approximately 2 wt percent (based on the monomer) of ethyleneglycol dimethacrylate was added to the solutions. The two solutions were mixed together. Within approximately 4.5 min., a maximum temperature of approximately 190° C. was reached and a solid polymer puck resulted.

Example 7

Dimethyl bis(cyclopentadienyl)zirconium (Cp$_2$ZrMe$_2$, 0.32 mmol) N,N-dimethylanilinium tetrakis (perfluorophenyl)borate [HNMe$_2$Ph] [B(C$_6$F$_5$)$_4$], 0.075 mmol) were dissolved separately in 5 mL of methylmethacrylate (distilled from triethylaluminum) each. Approximately 4 wt percent (based on the monomer) of ethyleneglycol dimethacrylate was added to the solutions. The two solutions were mixed together. Within approximately 4.5 min., a maximum temperature of approximately 190° C. was reached and a solid polymer puck resulted.

Example 8

Dimethyl bis(cyclopentadienyl)zirconium ($Cp_2ZrMe_2$, 0.32 mmol) N,N-dimethylanilinium tetrakis (perfluorophenyl)borate [$HNMe_2Ph$] [$B(C_6F_5)_4$], 0.075 mmol) were dissolved separately in 5 mL of methylmethacrylate (distilled from triethylaluminum) each. Approximately 10 wt percent (based on the monomer) of ethyleneglycol dimethacrylate was added to the solutions. The two solutions were mixed together. Within approximately 6.5 min., a maximum temperature of approximately 170° C. was reached and a solid polymer puck resulted.

Example 9

Dimethyl bis(cyclopentadienyl)zirconium ($Cp_2ZrMe_2$, 0.79 mmol) N,N-dimethylanilinium tetrakis (perfluorophenyl)borate [$HNMe_2Ph$] [$B(C_6F_5)_4$], 0.019 mmol) were dissolved separately in 5 mL of methylmethacrylate (distilled from triethylaluminum) each. Approximately 2 wt percent (based on the monomer) of ethyleneglycol dimethacrylate was added to the solutions. The two solutions were mixed together. Within approximately 4.5 min., a maximum temperature of approximately 125° C. was reached and a solid polymer puck resulted.

Example 10

Dimethyl bis(cyclopentadienyl)zirconium ($Cp_2ZrMe_2$, 0.16 mmol) N,N-dimethylanilinium tetrakis (perfluorophenyl)borate [$HNMe_2Ph$] [$B(C_6F_5)_4$], 0.038 mmol) were dissolved separately in 5 mL of methylmethacrylate (distilled from triethylaluminum) each. Approximately 10 wt percent (based on the monomer) of ethyleneglycol dimethacrylate was added to the solutions. The two solutions were mixed together. Within approximately 12 min., a maximum temperature of approximately 170° C. was reached and a solid polymer puck resulted.

Example 11

Example 10 was repeated. The polymer exhibited a Tg of 100° C. (by DSC). $^1H$ NMR analysis of the polymer revealed 59.0% syndiotactic, 35.0% atactic, and 6.0% isotactic content (at the triad level).

Example 12

Example 11 was repeated except tris(pentyl)ammonium tetraphenylborate (0.075 mmol) was substituted for the zirconium cation. The polymer exhibited a Tg of 126° C. (by DSC). $^1H$ NMR analysis of the polymer revealed 61.4% syndiotactic, 33.0% atactic, and 5.6% isotactic content (at the triad level).

Example 13

Dimethyl bis(cyclopentadienyl)zirconium ($Cp_2ZrMe_2$, 0.37 mmol) N,N-dimethylanilinium tetrakis(3,5-bis (trifluoromethyl)borate [$HNMe_2Ph$] [$B,2,6-(CF_3)_2C_6H_3)_4$], 0.075 mmol) were dissolved separately in 2.5 mL of methylmethacrylate (distilled from triethylaluminum) each. The two solutions were mixed together. Within approximately 2 min., an exothermic reaction took place and a solid polymer puck resulted.

Example 14

Bis(cyclopentadienyl)zirconium bis(dimethylmethoxy) enolate (($Cp_2Zr(OC(OMe)=CMe)_2$, 0.32 mmol) and 3,5 N,N-dimethylanilinium tetrakis(3,5-bis(trifluoromethyl) phenyl)borate([$HNMe_2Ph$] [$B(3,5-(CF_3)_2C_6H_3$], 0.075 mmol) were dissolved each in 5 mL of methylmethacrylate. The two solutions were mixed and within approximately 30 min., an exothermic polymerization occurred reaching a maximum temperature of approximately 55° C. to produce a polymer puck.

Example 15

Bis(cyclopentadienyl)zirconium bis(dimethylmethoxy) enolate (($Cp_2Zr(OC(OMe)=CMe)_2$, 0.32 mmol) and N,N-dimethylanilinium tetrakis (perfluorophenyl)borate( [$HNMe_2Ph$] [$B(C_6F_5)_4$], 0.037 mmol) were dissolved each in 5 mL of methylmethacrylate. The two solutions were mixed and immediately polymerization started to give a polymer puck.

Example 16

Dimethyl bis(cyclopentadienyl)zirconium ($Cp_2ZrMe_2$, 0.12 mmol) and N,N-dimethylanilinium tetrakis (perfluorophenyl)borate [$HNMe_2Ph$] [$B(C_6F_5)_4$], 0.031 mmol) were dissolved separately in 5 mL of methylmethacrylate. The zirconium containing solution was added to a vial containing 1 mg of a copper(II) blue dye (Hoechst/ Celanese 15-1046DV fast blue B2GA). The ammonium salt solution was then added to the vial.

Example 17

Dimethyl bis(cyclopentadienyl)zirconium ($Cp_2ZrMe_2$, 0.12 mmol) and N,N-dimethylanilinium tetrakis (perfluorophenyl)borate [$HNMe_2Ph$] [$B(C_6F_5)_4$], 0.031 mmol) were dissolved separately in 5 mL of methylmethacrylate. The zirconium containing solution was added to a vial containing glass fibers (Owens-Corning #158. The ammonium salt solution was then added to the vial. Within approximately 20 min. an exothermic reaction took place reaching a maximum temperature of approximately 145° C. to yield a polymer puck.

Example 18

Dimethyl bis(cyclopentadienyl)zirconium ($Cp_2ZrMe_2$, 0.12 mmol) and N,N-dimethylanilinium tetrakis (perfluorophenyl)borate [$HNMe_2Ph$] [$B(C_6F_5)_4$], 0.031 mmol) were dissolved separately in 5 mL of methylmethacrylate. The zirconium containing solution was added to a vial containing glass fibers (Owens-Corning #366. The ammonium salt solution was then added to the vial. Within approximately 12 min. an exothermic reaction took place reaching a maximum temperature of approximately 135° C. to yield a polymer puck.

Example 19

Dimethyl bis(cyclopentadienyl)zirconium ($Cp_2ZrMe_2$, 0.12 mmol) and N,N-dimethylanilinium tetrakis (perfluorophenyl)borate [$HNMe_2Ph$] [$B(C_6F_5)_4$], 0.031 mmol) were dissolved separately in 5 mL of methylmethacrylate which had not been distilled from $AlEt_3$. The solutions were mixed together and within approximately 23 min. an exothermic reaction took place reaching a maximum temperature of approximately 155° C. to yield a polymer puck. The molecular weights were determined by GPC to be $M_n$=76,000, $M_w$=120,000, $M_w/M_n$=1.58.

Example 20

This experiment was conducted identically to that in Example 19. After about 22 min., the reaction exotherm reached a maximum of about 155° C. Conversion of monomer to polymer was found to be 96% based on $^1H$ NMR spectroscopy.

Example 21

Dimethyl ethylene-bridged bis(indenyl)zirconium ($C_2H_4$ (Indenyl)$_2$ZrMe$_2$, 0.12 mmol) and N,N-dimethylanilinium tetrakis(perfluorophenyl)borate [HNMe$_2$Ph] [B($C_6F_5$)$_4$], 0.031 mmol) each were dissolved in 5 mL of methylmethacrylate. Within about 5 min. an exotherm of approximately 105° C. was reached. The polymer puck was dissolved in toluene, precipitated with methanol, and dried. The polymer contained 6% syndiotactic, 8% atactic, and 86% isotactic based on $^1$H NMR spectroscopy (at the triad level). The molecular weights were determined by GPC to be $M_n$=196,000, $M_w$=464,000, $M_w/M_n$=2.37.

Comparative Example 1

Azobis(isobutyronitrile) (AIBN, 1.2 mmol) was dissolved in methylmethacrylate (20 mL) and heated to 70° C. Within 25 min the temperature reached about 160° C. and a solid polymer puck formed. Conversion of the monomer to polymer was found to be 86 percent based on $^1$H NMR analysis. The molecular weights were determined by GPC to be $M_n$=13,506, $M_w$=97,700, $M_w/M_n$=7.24.

Bulk polymerization using the catalysts of the present invention yielded highly exothermic polymerization with fast reaction times to give high conversion of monomer to polymer. The tacticity of the polymer produced is controlled by the catalysts chosen which in turn determine the corresponding Tg of the polymer. The product produced utilizing methyl methacrylate monomers was at least translucent.

While in accordance with the patent statutes the best mode and preferred embodiment has been set forth, the scope of the invention is not limited thereto, but rather by the scope of the attached claims.

What is claimed is:

1. A RIM process comprising; the steps of
   feeding at least one stream comprising (a) one or more neutral organo group-4 catalysts and one or more monomers to a mixing apparatus;
   feeding at least one stream comprising (b) one or more activating cationic organo group-4 catalysts or one or more Lewis acids and one or more monomers to said mixing apparatus,
   said at least one (a) and (b) streams, independently, having monomers comprising, a monomer of the formula:

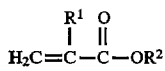
Formula I where $R^1$ is hydrogen or an alkyl having from 1 to 4 carbon atoms and $R^2$ is an alkyl or a cycloalkyl group having from 1 to 10 carbon atoms, or wherein $R^2$ is $R^5$-silyl-$R^6$ or $R^5$-siloxane-$R^7$ where $R^5$ is non-existent, or hydrogen, or an alkyl containing from 1 to 10 carbon atoms and where $R^6$ or $R^7$ is non-existent, hydrogen, or an alkyl having from about 1 to about 10 carbon atoms, wherein the number of silyl or siloxane repeat groups is from about 1 to about 1,000;
   or a monomer of the formula

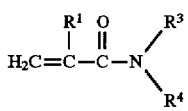

wherein $R^3$ and $R^4$ independently, is hydrogen, or a hydrocarbyl,
   or a lactam monomer having from 3 to 9 carbon atoms in the ring, or a lactone monomer having from 3 to 9 carbon atoms in the ring, or wherein said lactam and said lactone monomers are a substituted lactam or lactone wherein said one or more substituents is an alkyl having from 1 to 5 carbon atoms,
   or acrylonitrile or alkyl substituted derivatives thereof having from 1 to 4 carbon atoms,
   or combinations of said monomers,
   mixing said (a) and (b) streams,
   transferring said mixed (a) and (b) streams into a mold, and
   substantially polymerizing said monomers in said mold.

2. A RIM process according to claim 1, wherein said group-4 catalyst achieves at least 95 percent monomer conversion.

3. A RIM process according to claim 2, wherein said 95 percent monomer conversion is achieved within 30 minutes.

4. A RIM process according to claim 1, wherein said neutral organo group-4 catalyst has the formula

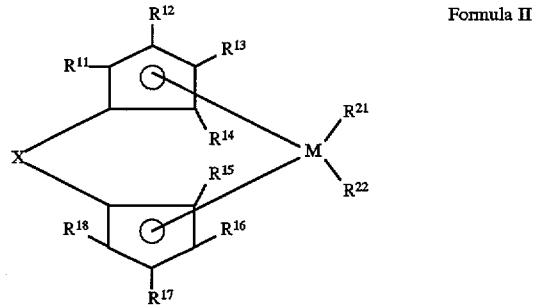
Formula II wherein $R^{11}$ through $R^{18}$, independently, is hydrogen, an alkyl from 1 to 10, a cycloalkyl having a total of 4 to 9 carbon atoms, an aryl or an alkyl substituted aryl having a total of from 6 to 15 carbon atoms, or wherein two adjacent hydrocarbon groups are connected to one another to form a hydrocarbon bridge between said two adjacent carbon atoms with said bridging carbon atoms being an alkylene having a total of from 2 to 8 carbon atoms, wherein X is a bridging linkage comprising CH$_2$, CMe$_2$, SiMe$_2$, CPh$_2$, SiPh$_2$, CH$_2$CH$_2$, or CR$^{31}$R$^{32}$CR$^{33}$R$^{34}$, wherein $R^{31}$ $R^{32}$, $R^{33}$, and $R^{34}$, independently, is hydrogen, an alkyl or cycloalkyl having from 1 to 10 carbon atoms, or an aryl or an alkyl substituted aryl having a total of from 6 to 15 carbon atoms, and wherein $R^{21}$ and $R^{22}$, independently, is hydrogen, an alkyl or cycloalkyl having from 1 to 10 carbon atoms, an aryl or an alkyl substituted aryl having from 6 to 15 carbon atoms, or a hydrocarbyloxy, a hydrocarbylsulfide, or a dihydrocarbylamido wherein the hydrocarbyl group is an alkyl or cycloalkyl group having from 1 to 10 carbon atoms, an aromatic or an alkyl substituted aromatic or an aromatic substituted alkyl group having from 6 to 15 carbon atoms, or where $R^{21}$ and $R^{22}$ are joined to form a ring having from 4 to 8 carbon atoms and optionally contain Ge or Si therein or optionally contain a hydrocarbyl substituent having from 1 to 8 carbon atoms, or an enolate of the formula

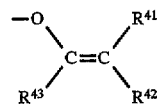

wherein $R^{41}$ and $R^{42}$, independently, is an alkyl having from 1 to 10 carbon atoms, a cycloalkyl having from 4 to 8 carbon atoms, or an aryl or an alkyl substituted aryl having a total of from 6 to 15 carbon atoms, and wherein $R^{43}$, independently, is the same as $R^{41}$ or is Si($R^{44}$)$_3$ where $R^{44}$, independently, is defined by $R^{41}$, and optionally where $R^{41}$ and $R^{42}$, or $R^{42}$ and $R^{43}$, are joined to form a ring, and optionally where $R^{43}$ of each enolate can be joined together, and wherein the metal is titanium, zirconium, or hafnium, or wherein said neutral group-4 catalyst has the formula

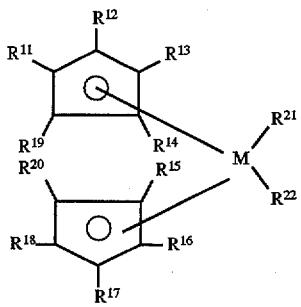

Formula III wherein $R^{19}$ and $R^{20}$, independently, is defined by $R^{11}$.

5. A RIM process according to claim 1, wherein said cationic catalyst has the formula

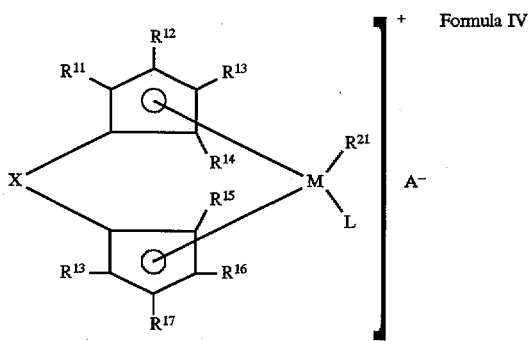

Formula IV or the formula

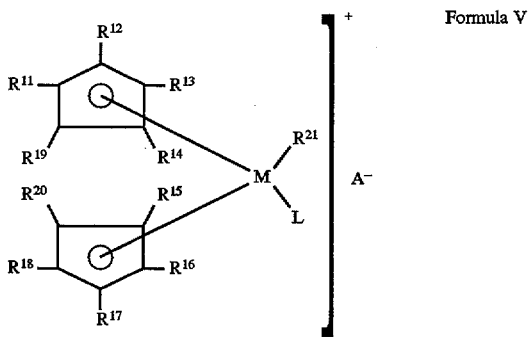

Formula V wherein M, $R^{11}$ through $R^{21}$, and X, are defined in claim 4,
wherein L is a neutral Lewis acid,
wherein in the absence of a suitable ligand donor L, the cationic metal center exists as a Zwitterionic complex wherein said A⁻ anion stabilizes the group-4 cation by weak coordination to the group-4 metal center, wherein said A⁻ anion can be easily displaced by a neutral Lewis base, or
A⁻ is

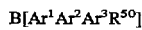  Formula VI where $Ar^1$, $Ar^2$, $Ar^3$, independently, is a hydrocarbyl or halocarbyl substituted aryl group and $R^{50}$ is a hydrocarbyl or halocarbyl substituted aryl group, or $R^{50}$ can be the labile ligand from the organo group-4 catalyst; or A⁻ is a polyhedral borane, a carborane, or a metallacarborane.

6. A RIM process according to claim 5, wherein said cationic catalysts are formed in situ by reacting a Lewis acid with said neutral organo group-4 catalyst.

7. A RIM process according to claim 6, wherein said one or more monomers is methyl methacrylate.

8. A process according to claim 6, wherein said neutral catalyst is dimethyl ethylenebis($\eta^5$-tetrahydroindenyl) zirconium, dimethyl bis($\eta^5$-cyclopentadienyl)zirconium, bis ($\eta^5$-cyclopentadienyl)zirconium bis(dimethylmethoxy) enolate or dimethyl ethylene-bridged bis($\eta^5$-indenyl) zirconium, dimethyl bis($\eta^5$-pentamethylcyclopentadienyl) zirconium, or combinations thereof, and wherein said Lewis acid is tris(perfluorophenyl)borane, tris(pentyl) ammonium tetraphenylborate, tributylammonium tetraphenylborate, triethylammonium tetraphenylborate, N,N-dimethylanilinium tetrakis(perfluorophenyl)borate, or tripentylammonium tetrakis (3,5-bis(trifluoromethyl) phenyl)borate, triphenyl carbenium tetrakis(perfluorophenyl)borate, or combinations thereof.

9. A process according to claim 8, wherein said one or more monomers is methyl methacrylate.

10. A polymer composition comprising the reaction product resulting from the combination of at least two substantially diluent free reactant streams to form a reactive mixture then conveying said reaction mixture into a mold where polymerization takes place, one reactant stream of which comprises one or more neutral organo group-4 catalyst(s) and one or more monomer(s), and another of which comprises one or more activating cationic organo group-4 catalyst(s) or an organic Lewis acid and one or more monomer(s), said one or more of each monomer(s) of each reactant stream, independently, having the formula:

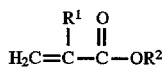

wherein $R^1$ is hydrogen or an alkyl group having from 1 to 4 carbon atoms and $R^2$ is an alkyl or a cycloalkyl group having from 1 to 10 carbon atoms, or wherein $R^2$ is $R^5$-silyl-$R^6$ or $R^5$-siloxane-$R^7$ where $R^5$ is non-existent, or an alkylene radical containing from 1 to 10 carbon atoms and where $R^6$ or $R^7$ is non-existent, hydrogen, or an alkyl group having from 1 to 10 carbon atoms, wherein the number of siloxane repeat groups is from about 1 to about 1000;

or a monomer having the formula:

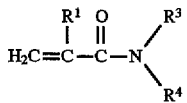

wherein $R^1$ is as defined in the formula above and $R^3$ and $R^4$, independently, represent hydrogen, or a hydrocarbyl group;
or a lactam monomer having from 3 to 9 carbon atoms in the ring, or a lactone monomer having from 3 to 9 carbon atoms in the ring, or wherein said lactam and said lactone monomers are a substituted lactam or lactone, wherein said substituents are alkyl groups from 1 to 5 carbon atoms;
or an acrylonitrile monomer having the formula:

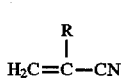

wherein R is hydrogen or an alkyl group having from 1 to 4 carbon atoms; or combinations of said monomers.

11. A polymer according to claim 10, wherein said neutral catalyst is

Formula II

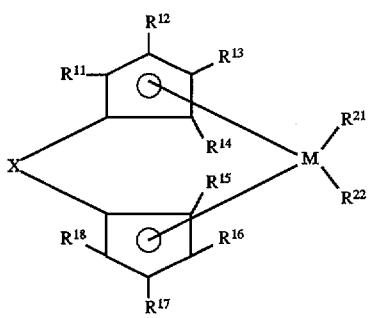

wherein $R^{11}$ through $R^{18}$, independently, is hydrogen, an alkyl from 1 to 10, a cycloalkyl having a total of 4 to 9 carbon atoms, an aryl or an alkyl substituted aryl having a total of from 6 to 15 carbon atoms, or wherein two adjacent hydrocarbon groups are connected to one another to form a hydrocarbon bridge between said two adjacent carbon atoms with said bridging carbon atoms being an alkylene having a total of from 2 to 8 carbon atoms, wherein X is a bridging linkage comprising $CH_2$, $CMe_2$, $SiMe_2$, $CPh_2$, $SiPh_2$, $CH_2CH_2$, or $CR^{31}R^{32}CR^{33}R^{34}$, wherein $R^{31}$ $R^{32}$, $R^{33}$, and $R^{34}$, independently, is hydrogen, an alkyl or cycloalkyl having from 1 to 10 carbon atoms, or an aryl or an alkyl substituted aryl having a total of from 6 to 15 carbon atoms, and wherein $R^{21}$ and $R^{22}$, independently, is hydrogen, an alkyl or cycloalkyl having from 1 to 10 carbon atoms, an aryl or an alkyl substituted aryl having from 6 to 15 carbon atoms, or a hydrocarbyloxy, a hydrocarbylsulfide, or a dihydrocarbylamido wherein the hydrocarbyl group is an alkyl or cycloalkyl group having from 1 to 10 carbon atoms, an aromatic or an alkyl substituted aromatic or an aromatic substituted alkyl group having from 6 to 15 carbon atoms, or where $R^{21}$ and $R^{22}$ are joined to form a ring having from 4 to 8 carbon atoms and optionally contain Ge or Si therein or optionally contain a hydrocarbyl substituent having from 1 to 8 carbon atoms, or an enolate of the formula

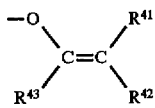

wherein $R^{41}$ and $R^{42}$, independently, is an alkyl having from 1 to 10 carbon atoms, a cycloalkyl having from 4 to 8 carbon atoms, or an aryl or an alkyl substituted aryl having a total of from 6 to 15 carbon atoms, and wherein $R^{43}$, independently, is the same as $R^{41}$ or is $Si(R^{44})_3$ where $R^{44}$, independently, is defined by $R^{41}$, and optionally where $R^{41}$ and $R^{42}$, or $R^{42}$ and $R^{43}$, are joined to form a ring, and optionally where $R^{43}$ of each enolate can be joined together, and wherein the metal is titanium, zirconium, or hafnium, or wherein said neutral group-4 catalyst has the formula Formula III

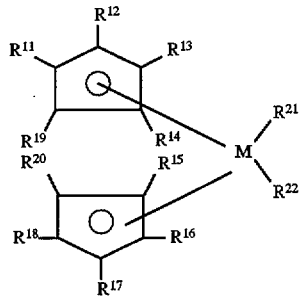

wherein $R^{19}$ and $R^{20}$, independently, is defined by $R^{11}$.

12. A polymer according to claim 11, wherein said cationic catalyst has the formula Formula IV

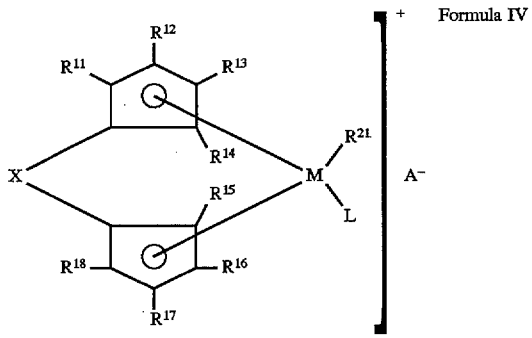

or the formula

Formula V

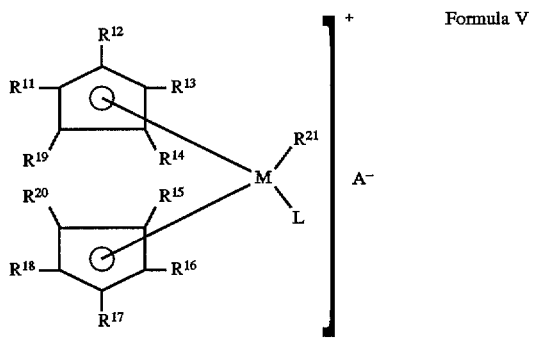

wherein M, $R^{11}$ through $R^{21}$, X, are defined in claim 11, wherein L is a neutral Lewis acid, wherein in the absence of a suitable ligand donor L, the cationic metal center can exist as a Zwitterionic complex wherein said $A^-$ anion has the capability of stabilizing the group-4 cation by weak coordination to the group-4 metal center, wherein said $A^-$ anion can be easily displaced by a neutral Lewis base, or $A^-$ is $B[Ar^1Ar^2Ar^3R^{50}]$   Formula VI where $Ar^1$, $Ar^2$, $Ar^3$, independently, is a hydrocarbyl or halocarbyl substituted aryl group and $R^{50}$ is a hydrocarbyl or halocarbyl substituted aryl group, or $R^{50}$ can be the labile ligand from the organo group-4 catalyst; or A⁻ is a polyhedral borane, a carborane, or a metallacarborane.

13. A polymer according to claim 12 wherein said one or more monomers is methyl methacrylate.

14. A polymer according to claim 13, wherein said cationic catalyst is formed in situ by reacting a Lewis acid with said neutral organo group 4 catalyst, wherein said neutral catalyst is dimethyl ethylenebis($\eta^5$-tetrahydroindenyl)zirconium, dimethyl bis($\eta^5$-cyclopentadienyl)zirconium, bis($\eta^5$-cyclopentadienyl)zirconium bis(dimethylmethoxy)enolate or dimethyl ethylene-bridged bis($\eta^5$-indenyl)zirconium, dimethyl bis($\eta^5$-pentamethylcyclopentadienyl)zirconium or combinations thereof, and wherein said Lewis acid is tris(perfluorophenyl)borane, tris(pentyl)ammonium tetraphenylborate, tributylammonium tetraphenylborate, triethylammonium tetraphenylborate, N,N-dimethylanilinium tetrakis(perfluorophenyl)borate or tripentylammonium tetrakis (3,5-bis(trifluoromethyl)phenyl)borate, triphenyl carbenium tetrakis(perfluorophenyl)borate, or combinations thereof.

15. A polymer according to claim 11, wherein said neutral catalyst is dimethyl ethylenebis($\eta^5$-tetrahydroindenyl)zirconium, dimethyl bis($\eta^5$-cyclopentadienyl)zirconium, bis($\eta^5$-cyclopentadienyl)zirconium bis(dimethylmethoxy) enolate or dimethyl ethylene-bridged bis($\eta^5$-indenyl)zirconium, dimethyl bis($\eta^5$-pentamethylcyclopentadienyl)zirconium, or combinations thereof, and wherein said Lewis acid is tris(perfluorophenyl)borane, tris(pentyl)ammonium tetraphenylborate, tributylammonium tetraphenylborate, triethylammonium tetraphenylborate, N,N-dimethylanilinium tetrakis(perfluorophenyl)borate, or tripentylammonium tetrakis (3,5-bis(trifluoromethyl) phenyl)borate, triphenyl carbenium tetrakis(perfluorophenyl)borate, or combinations thereof.

16. A polymer according to claim 10, wherein said component comprising one or more neutral organic group-4 catalysts and one or more monomers, and wherein said component comprising one or more activating cationic organo group-4 catalysts or an organic Lewis acid end one or more monomers, are reacted by reaction injection molding.

* * * * *